Figure 2:
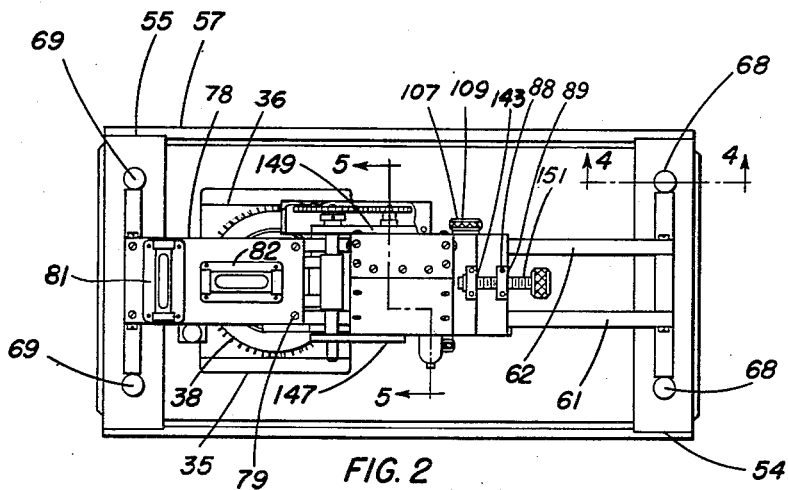

July 16, 1957 L. N. HEYNICK ET AL 2,799,824
SHOCK TESTING DEVICE

Filed March 10, 1953 4 Sheets-Sheet 1

INVENTORS
LOUIS N. HEYNICK
MARVIN SCHNEE
STANLEY WINKLER
ROBERT J. WOHL
BY George Sipkin
ATTORNEY July 16, 1957 L. N. HEYNICK ET AL 2,799,824
SHOCK TESTING DEVICE
Filed March 10, 1953 4 Sheets-Sheet 2

INVENTORS
LOUIS N. HEYNICK
MARVIN SCHNEE
STANLEY WINKLER
ROBERT J. WOHL
BY
George Liptin
ATTORNEY July 16, 1957

L. N. HEYNICK ET AL 2,799,824

SHOCK TESTING DEVICE

Filed March 10, 1953

4 Sheets-Sheet 4

FIG. 8

INVENTORS
LOUIS N HEYNICK
MARVIN SCHNEE
STANLEY WINKLER
BY ROBERT J. WOHL

George Sipkin
ATTORNEY

| United States Patent Office | 2,799,824
Patented July 16, 1957 |

2,799,824

SHOCK TESTING DEVICE

Louis N. Heynick, Marvin Schnee, Stanley Winkler, and Robert J. Wohl, New York, N. Y., assignors to the United States of America as represented by the Secretary of the Navy Application March 10, 1953, Serial No. 341,628

15 Claims. (Cl. 324—20)

(Granted under Title 35, U. S. Code (1952), sec. 266)

The invention described herein may be manufactured and used by or for the Government of the United States of America for governmental purposes without the payment of any royalties thereon or therefor.

The present invention concerns a shock tester for imparting shock of controlled magnitude and repetition frequency to test specimens and for ascertaining response of the test specimens to the shock imparted thereto. In particular the present invention concerns a device for testing the response of specimens of electronic components such as vacuum tubes to shock ranging from an energy level sufficient for exciting audio- and radio-frequency noise and microphonism in the specimen to an energy level high enough to cause mechanical failure in the specimen.

Electronic components, particularly those which are destined for military application, are subject in use to shock that arises through rough handling. Additionally the components are also subject to shock that is imparted by mechanical equipment with which the electronic components are associated. For example, vacuum tubes used in connection with fire control equipment which controls the firing of large caliber guns aboard naval fighting vessels, are subject to considerable shock derived from firing recoil. Such shock effects change the operational characteristics of the vacuum tubes; for example, the shock can cause the generation of extraneous noise and microphonic output. If of a sufficiently high energy level, the shock can cause mechanical failure. Repeated shocks of an energy level lower than that for causing mechanical failure can cause mechanical fatigue in the parts of the vacuum tubes.

Therefore it is necessary in the manufacture of electronic components (particularly for military application) to provide a standardized testing device and standardized procedures for testing the effects of shock on specimens of such electronic components. It is necessary for the testing device to impart shock of controlled and reproducible magnitude and also to impart shock at a controlled repetition frequency for a controlled number of cycles to a specimen that is isolated from extraneous mechanical disturbances. It is further necessary for the testing device to include means for ascertaining and indicating electrical effects of the shock imparted to the electronic components in conclusive objective terms.

The present invention provides a shock testing device that meets the above requirements. One part of the device comprises a pendulum tapper for imparting shock of controlled magnitude and repetition frequency to an electronic component test specimen which specimen is isolated from extraneous mechanical disturbances. The pendulum tapper is adapted to impart shock of identical magnitude at controlled intervals for a controlled number of cycles. The shock testing device also includes in combination with the pendulum tapper an electronic circuit of which the electronic component test specimen being tested is a part; if a vacuum tube is being tested, selected elements of such vacuum tube form a part of the electronic circuit. The electronic circuit operates to afford an indication of the change in operational characteristics of the electronic component being tested; if a vacuum tube is being tested, the electronic circuit provides an indication of peak and average noise and microphonic output generated by the vacuum tube due to the imparted shock. The tapper further can be used for the purpose of inducing mechanical fatigue in the elements of an electronic component test specimen or for the purpose of causing mechanical failure of the elements.

An object of the invention is to provide a shock testing device.

Another object is to provide a shock testing device that is operable either automatically or manually.

Another object is to provide a shock testing device for imparting shock of controlled characteristics to a test specimen.

Another object is to provide a shock testing device for imparting blows to a test specimen that are selectively destructive or non-destructive.

Another object is to provide a shock testing device for imparting repeated shocks to a test specimen at controlled intervals and for a controlled number of cycles.

Another object is to provide a shock testing device adapted to excite microphonism over a wide band of frequencies in a test specimen.

Another object is to provide a shock testing device for exciting microphonism in a vacuum tube test specimen resulting in audio and radio frequency noise output from the test specimen.

Another object is a to provide a shock testing device for indicating changes in operating characteristics of a test specimen as a result of shock imparted thereto.

Another object is to provide a shock testing device for inducing mechanical fatigue in the elements of the test specimen.

Another object is to provide a shock testing device adapted to give an objective indication of the resonance response in electronic components.

Another object is to provide a shock testing device that readily objectively and conclusively indicates any substandard test specimens.

Another object is to provide an improved design for shock testing devices such that a shock testing device embodying said design according to specified dimensions performs substantially identically to every other shock testing device embodying said design and made according to the aforesaid specified dimensions and wherein any one of said shock testing devices can operate cyclically on a test specimen with identical performance for every cycle.

Figure 1:
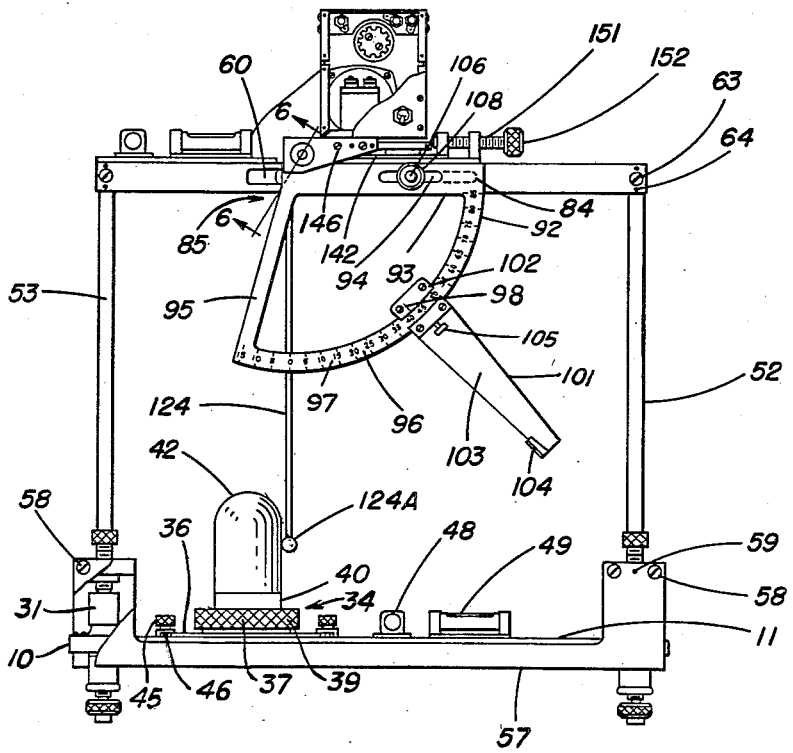
Figure 3:
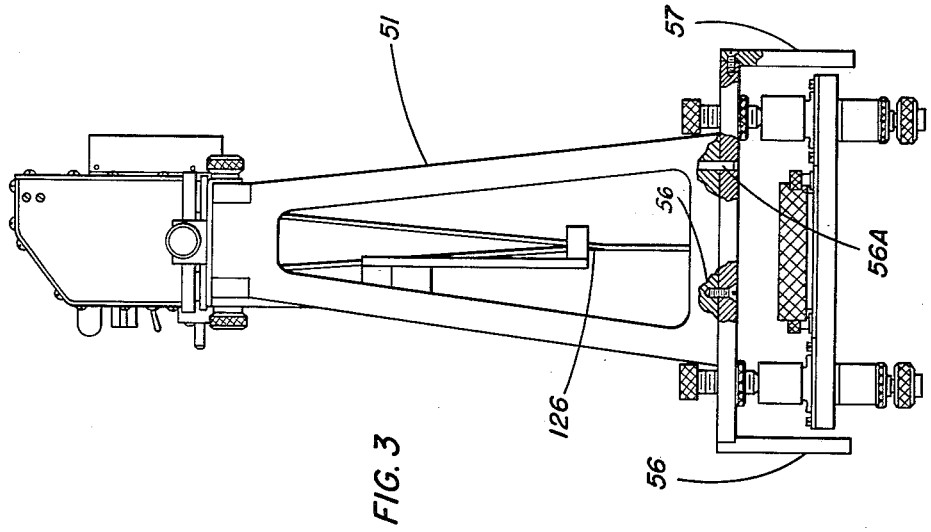

Other objects and many of the attendant advantages of this invention will be readily appreciated as the same becomes better understood by reference to the following detailed description when considered in connection with the accompanying drawings wherein:

Fig. 1 is a front elevation of a preferred embodiment of the pendulum tapper forming part of the invention, Fig. 2 is a plan view seen from the top of Fig. 1, Fig. 3 is a side elevation seen from the right of Fig. 1.

Figure 7:
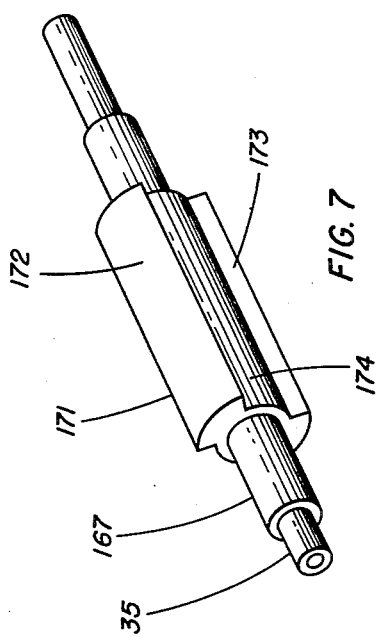
Figure 9:
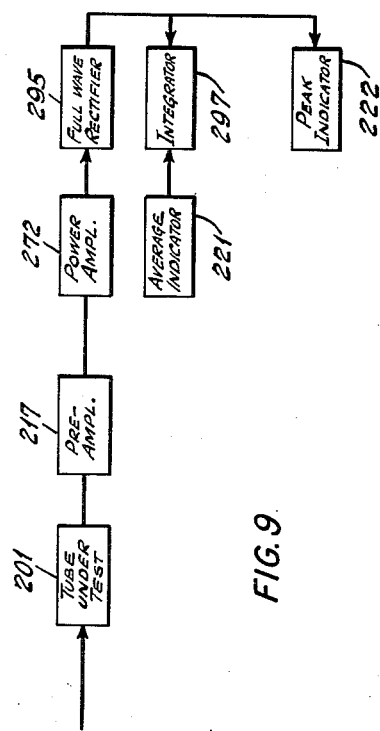
Figure 5:
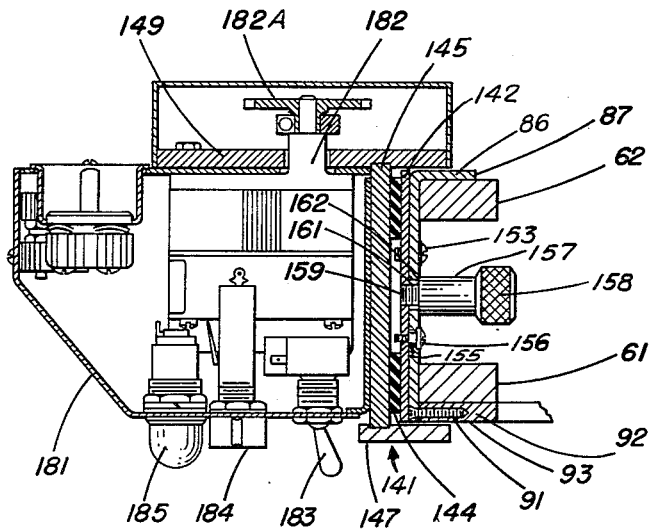
Figure 4:
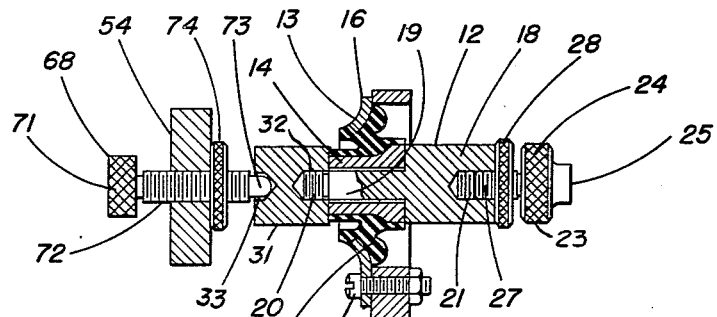
Figure 6:
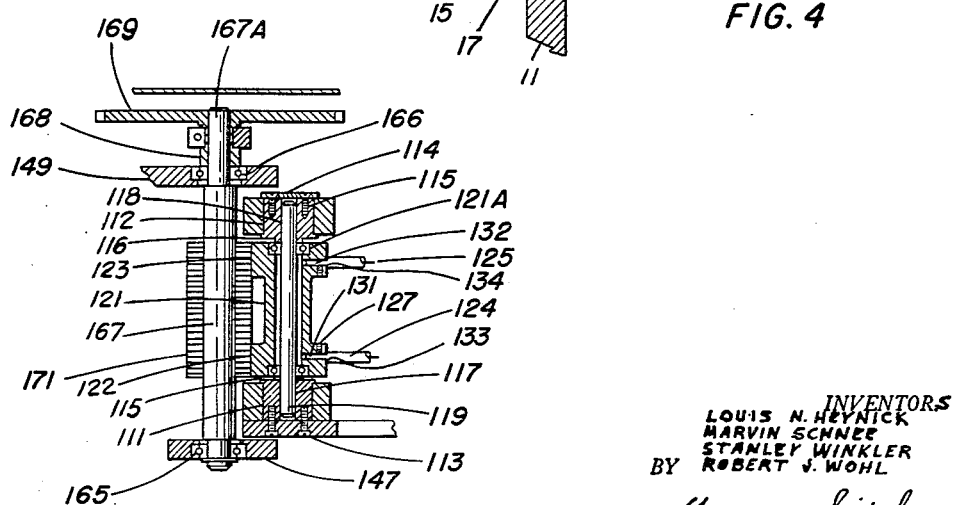

Fig. 4 is a sectional detail view of the base mount including a vibration isolator for mounting the baseplate of the pendulum tapper, Fig. 5 is a sectional view taken substantially along line 5—5 of Fig. 2, Fig. 6 is a sectional view taken substantially along line 6—6 of Fig. 1, Fig. 7 is an isometric view of one embodiment of cam forming one component of the pendulum tapper, Fig. 8 is a schematic diagram partially in block form showing a preferred embodiment of a circuit adapted to be used with the tapper, and Fig. 9 is a modified version of the circuit.

There is shown in Figs. 1, 2, and 3 a pendulum tapper for imparting shock to test specimens. The tapper includes a base assembly indicated generally at 10 and comprising a baseplate 11 that is mounted upon a base mount including four base posts 12 (see Fig. 4) by means of four vibration isolators 13. Each vibration isolator 13 serves to secure a single base post 12 with respect to baseplate 11. Each vibration isolator 13 comprises a sleeve 14 about the outside of which is bonded a coaxial annulus 15 of resilient material such as rubber. About the outside of annulus 15 there is bonded a coaxial collar 16. Each vibration isolator 13 is secured to base plate 11 by means of nut-and-screw assemblies 17.

Each base post 12 comprises a shank 18 having a reduced portion 19 that terminates in a threaded extremity 20. The end of shank 18 remote from threaded extremity 20 is provided with a threaded axial recess 21. At the lower end of each base post 12 there is provided a base adjusting screw 23 having a knurled center portion 24 and a pedestal 25 adapted to rest upon a laboratory table or other suitable foundation. Base adjusting screw 23 remote from pedestal 25 is provided with a shank portion 27 that is externally threaded and screwed into base post 12. A locknut 28 is turned upon threaded shank 27 of base adjusting screw 23. At the upper end of each base plate 12 there is provided an intermediate post 31 having an axial threaded recess 32 at its lower end and at its upper end having a bearing recess 33. The intermediate post is made available in a plurality of lengths for purposes of height adjustment of the superstructure 51, subsequently described.

The structure thus far described is assembled in the following manner. Each vibration isolator 13 is secured to base plate 11 by means of nut-and-screw assemblies 17. Base plate 11 with its four assembled vibration isolators 13 is then assembled with the four base posts 12 by slipping sleeve 14 of each vibration isolator 13 over a corresponding reduced portion 19 of a base post 12. The intermediate post 31 is then threaded onto the extremity 20 of each base post 12 and tightened to lock securely sleeve 14 of the corresponding vibration isolator 13 upon corresponding base post 12. A locknut 28 is loosely turned upon each base adjusting screw 23 and each base adjusting screw 23 is then threaded into a corresponding recess 21 of a base post 12. Locknuts 28 are then tightened against their corresponding base posts 12. The base adjusting screws 23 and locknuts 28 are used for leveling the base assembly 10.

Provided in the top of base plate 11 near one end thereof is an elongated recess 35 (see Fig. 2) the lengthwise dimension of which extends transversely of base plate 11. Disposed within recess 35 is a specimen support assembly indicated generally at 34 (see Fig. 1) and comprising a rectangular azimuth plate 36 that can be adjusted along slot 35 transversely of base plate 11 but that is restrained from movement in a direction lengthwise of base plate 11. Azimuth plate 36 is provided with an upstanding boss 37. Inscribed on the top of azimuth plate 36 uniformly about boss 37 are azimuth markings 38. Secured upon boss 37 of azimuth plate 36 is a knurled cap 39. An adaptor 40 of any suitable design having a radial flange (not shown) can be seated upon the top of boss 37 of azimuth plate 36 and clamped tightly thereagainst by an inwardly extending flange (not shown) on cap 39. Different adaptors 40 of different heights can be used to mount a specimen 42 for a test at any desired height above base plate 11 and if desired such adaptor 40 can be designed to accommodate special specimens 42 for a test; for example, the adaptor 40 can incorporate a tube socket properly to hold a specimen vacuum tube 42 for testing.

Disposed at the rim of recess 35 in base plate 11 are a pair of clamping screws 45 upon each of which is mounted a clamping dog 46. Dogs 46 are designed to overlap and clamp azimuth plate 36 in preselected position in recess 35 upon tightening screws 45.

Adjustment of test specimen 42 can be had either transversely of base plate 11 or rotationally in azimuth. Adjustment transversely of base plate 11 is accomplished by loosening clamping screws 45 with resultant loosening of clamping dogs 46; azimuth plate 36 is then moved in recess 35 of base plate 11 to desired position and clamping screws 45 are retightened to reclamp dogs 46 against azimuth plate 36 and thereby lock azimuth plate 36 and specimen 42 in a new transverse position. Rotation in azimuth is accomplished by unscrewing cap 39 from threaded boss 37 of azimuth plate 36 and rotating in azimuth the adaptor 40 that supports the specimen 42 to be tested. An indication of the position in azimuth of the adaptor 40 supporting specimen 42 is afforded by azimuth markings 38 in combination with any suitable pointer or the like (not shown) on adaptor 40. When the adaptor 40 is rotated into desired position it is locked in this position by tightening cap screw 39 on threaded boss 37 of azimuth plate 36.

Secured to the top of base plate 11 are levels 48, 49. Level 48 extends transversely of base plate 11 and level 49 extends longitudinally of base plate 11. Base assembly 10 is levelled in the following manner: The four locknuts 28 (see Fig. 4) associated with base posts 12 are loosened. The four base adjusting screws 23 are then turned to level base plate 11 both transversely and longitudinally as indicated by levels 48, 49. When base assembly 10 is levelled as indicated by levels 48, 49 the four locknuts 28 are tightened to lock base adjusting screws 23 in their adjusted positions.

Mounted on the four intermediate posts 31 is a superstructure indicated generally at 51 (see Fig. 3). Superstructure 51 comprises side plates 52, 53 to the bottom surfaces of which are fastened side supports 54, 55 by means of machine screws 56 and locating pins 56A. Side supports 54, 55 are fastened together by rails 57 secured in place by machine screws 58 and locating pins 59. At their top extremities, side plates 52, 53 are joined together by bars 61, 62 that are rabbeted into said plates 52, 53 and fastened by means of machine screws 63 and locating pins 64. Bars 61 and 62 are provided with slots 60 that are in transverse alignment. Extending through side support 54 is a pair of adjusting screws 68 and extending through side support 55 is a pair of adjusting screws 69. Adjusting screws 68, 69 are located so that they are in registration with the four bearing recesses 33 formed in the four intermediate posts 31. Each adjusting screw 68, 69 is provided with a knurled head 71 (see Fig. 4), a threaded shank 72 and a rounded extremity 73 for seating in a bearing recess 33 and adapted for rotation relative thereto. Turned upon each adjusting screw 68, 69 is a knurled locknut 74.

The superstructure 51 is assembled in the following manner. Side plates 52, 53 are fastened to side supports 54, 55 respectively. Rails 57 are fastened to opposite ends of side supports 54, 55. Bars 61, 62 are secured in place to provide a rigid construction. Then, adjusting screws 68 are threaded through side support 54 and adjusting screws 69 are threaded through side support 55. Locknuts 74 are turned loosely upon adjusting screws 68, 69. Superstructure 51 is then seated in place upon the four intermediate posts 31 with the rounded extremities 73 of adjusting screws 68, 69 seating in bearing recesses 33. By this construction vibration of superstructure 51 is transmitted through base posts 12 to the laboratory bench or other foundation; such vibration is not transmitted to base plate 11 because of vibration isolator 13. Correspondingly, by virtue of this same structural arrangement, vibration of the laboratory bench or other foundation is not transmitted to base plate 11.

Mounted atop bars 61, 62 is a plate 78 secured in place by machine screws 79. Mounted upon plate 78 are levels 81, 82. Level 81 extends transversely relative to plate 78 and level 82 extends longitudinally with respect thereto. Superstructure 51 is levelled in the following manner: Locknuts 74 on adjusting screws 68, 69 are loosened. Adjusting screws 68, 69 are turned until the assembly of side supports 54, 55 and associated structure is levelled both transversely and longitudinally as indicated by levels 81, 82. When the assembly of side supports 54, 55 and associated structure is levelled as indicated by levels 81, 82, locknuts 74 are tightened to lock the screws 68, 69 in their adjusted positions.

Mounted on superstructure 51 atop rails 61, 62 is a means for automatically actuating the pendulum structure 121, 124, 125 and 124A. These means comprise a clamping plate 86 (see Fig. 5) that rests upon the top surfaces of rails 61, 62 and that is provided with a downwardly turned flange 87 that is adapted to slide in bearing relationship with the outerside of rail 62. Flange 87 is provided with an elongated slot 84 (see Fig. 1). Mounted on the top of clamping plate 86 and at one end thereof by machine screws 88 is an adjusting post 89. Secured along one side of clamping plate 86 by means of machine screws 91 (see Fig. 5) is an arcuate indicator segment 92. Indicator segment 92 is provided with a radial arm 93 adapted to slide in bearing relationship with bar 61 in the manner in which flange 87 slides along bar 62. Arm 93 is provided with an elongated slot 94 that is out of transverse alignment with slot 84 in flange 87. Arcuate indicator segment 92 has a second radial arm portion 95. Connecting the extremities of radial arm 93 and radial arm 95 is a sector 96 that has inscribed thereon angular markings 97. Mounted for sliding movement on arcuate sector 96 is a stop 101 that includes a shoe 102 adapted for sliding along arcuate sector 96 together with a radial arm 103 at the outer extremity of which is a stop plate 104. A lock screw 105 is provided for locking stop 101 in selected position along arcuate sector 96. An index mark 98 is provided upon shoe 102 for registration with angular markings 97 on arcuate sector 96 to indicate the angular location of stop 101 and stop plate 104. Fixedly mounted in bars 61, 62 and extending outwardly therefrom are threaded pins 106 and 107. Pins 106 and 107 are adapted to extend one through slot 94 in radial arm 93 and the other through slot 84 in flange 87. Turned upon pins 106 and 107 are locknuts 108, 109.

As seen in Fig. 6 blocks 111 and 112 extend through slots 60 in bars 61, 62. Block 111 is secured to radial arm 93 by machine screws 113. Block 112 is secured to an end plate 114 by means of machine screws 115. Blocks 111, 112 at their inboard extremity are provided with radial flanges 115, 116 that bear against the inboard surfaces of bars 61, 62. Blocks 111, 112 are provided with aligned bores 117, 118 within which is disposed a shaft 119. Mounted for swinging movement upon shaft 119 is a housing 121 provided with bearings 121A. The axial extremities of housing 121 are provided with peripheral friction surfaces 122, 123. Depending from housing 121 near the axial extremities thereof are pendulum arms 124, 125 that form a V-shape construction with arms 124, 125 being joined together at 126 (Fig. 3). A pendulum ball 124A is secured to the bottom of pendulum arms 124, 125. Arms 124, 125 are fastened with respect to housing 121 by means of set screws 127. Pendulum arms 124, 125 are provided with reduced portions 131, 132 that form locating shoulders 133, 134 to insure that pendulum arms 124, 125 are correctly positioned relative to housing 121.

To adjust pendulum support 85 along bars 61, 62 locknuts 108, 109 are loosened to permit sliding of pendulum support 85 into desired position. This permits proper location of pendulum ball 124A when at rest relative to test specimen 42. During this adjusting operation pins 106 and 107 extending outwardly from bars 61, 62 remain fixed relative to bars 61, 62 while the radial arm 93 and the flange 87 whose slots 94 and 84 respectively are in registration with pins 106 and 107, slide relative to bars 61, 62. When pendulum support 85 is adjusted into desired position locknuts 108, 109 are tightened.

A frame assembly indicated generally at 141 (see Fig. 5) is adjsutably mounted on pendulum support 85. Frame assembly 141 includes a bottom plate 142 that rests upon the top of clamping plate 86 and that is arranged for limited adjustment in a longitudinal direction relative to clamping plate 86. At the right end of bottom plate 142 as seen in Fig. 2 is an adjusting bracket 143. Fastened to the top surface of bottom plate 142 adjacent the four corners thereof are four pads 144 preferably of neoprene. Resting on the top of pads 144 is a top plate 145 that parallels bottom plate 142. Secured to the edge of top plate 145 by machine screws 146 (see Fig. 1) and overlapping indicator segment 92 in slightly spaced relation is a depending flange 147. Mounted along the edge of top plate 145 opposite depending flange 147 is an upstanding flange 149.

Threaded through adjusting post 89 is a screw 151 having a knurled head 152. The extremity of screw 151 remote from knurled head 152 is mounted to turn freely in adjusting bracket 143 without axial feed of screw 151 therethrough. As seen in Fig. 1 turning of screw 151 causes axial feed of the screw through adjusting post 89 to cause movement of adjusting bracket 143 with frame assembly 141 toward or away from adjusting post 89 depending on the direction of turning of screw 151. Bottom plate 142 is maintained in assembled relation upon clamping plate 86 by means of machine screws 153 having unthreaded portions of increased diameter under the heads. The screws 153 are threaded into bottom plate 142 with the shanks of the screws extending through elongated slots 155 formed in clamping plate 86. Elongated slots 155 extend longitudinally of clamping plate 86. Washers 156 and the portions of increased diameter on screws 153 serve to slidably fasten bottom plate 142 and clamping plate 86 together when machine screws 153 are in tightened position. A screw 157 having a knurled head 158 and a reduced threaded extremity 159 forming clamping shoulder 162 is threaded into bottom plate 142. Reduced extremity 159 extends through an elongated longitudinal slot 161 in clamping plate 86. Elongated slot 161 parallels elongated slots 155. Clamping shoulder 162 on screw 157 serves to lock bottom plate 142 and clamping plate 86 together when screw 157 is tightened.

Supported in depending flange 147 and upstanding flange 149 by means of bearings 165, 166 is a shaft 167. Shaft 167 extends completely through upstanding flange 149 and is provided with a projecting extremity 167A upon which is mounted a spacer 168 and a gear 169 that is mounted for rotation with shaft 167. Fixedly mounted on shaft 167 is a cam 171 which in the embodiment shown in Fig. 7 comprises a pair of diametrically opposed friction segments 172, 173. Cams having various members of friction segments may be used in place of the one shown in Fig. 7. Cam 17, between friction segments 172, 173, is formed with cutouts as seen at 174, 175. As seen in Fig. 6, under operating conditions cam 171 is disposed with segments 172, 173 adapted for friction contact with peripheral surfaces 122, 123 of housing 121.

To condition the device for operation, the relative position of cam 171 with respect to housing 121 can be adjusted in order to adjust the friction between segments 172, 173 of cam 171 and the peripheral surfaces 122, 123 of housing 121. This adjustment is made in the following manner. Screw 157 (Fig. 5) is loosened. Screw 151 (Fig. 1) is turned to move adjusting bracket 143 and shaft 167 either toward or away from adjusting post 89; this serves to move shaft 167 either away from or toward shaft 119 which results in decreasing or increasing the friction between segments 172, 173 of cam 171 and peripheral surfaces 122, 123 of housing 121. As seen in Fig. 7 segments 172, 173 extend over substantially a 90 degree arc with cutouts 174, 175 likewise extending over 90 degree arcs. Thus it is seen that rotation of shaft 167 through 180 degrees is effective to cause, through frictional engagement, counter rotation of shaft 119. Pendulum ball 124A is carried thereby through substantially 90 degrees for the diameter ratio shown, moving pendulum ball 124A from the position shown in Fig. 1 into contact with stop 101. During the remaining part of the 180 degree rotation of shaft 167, cutout 174 or 175 is in registration with peripheral surfaces 122, 123 of housing 121 which permits housing 121 to be released. Housing 121 together with pendulum ball 124A thereby carried is free under the action of gravity to return to the position shown in Fig. 1. Should pendulum ball 124A be arrested against stop 101 in less than a substantially 90 degree swing, as is the case in Fig. 1, there will be slippage between segments 172, 173 on the one hand and peripheral surfaces 122, 123 on the other hand until cutouts 174, 175 are in registration with surfaces 122, 123.

Operation of the device is as follows. Base plate 11 is first levelled by loosening the four locknuts 28 associated with the four base posts 12. The four base adjusting screws 23 are then turned to level base plate 11 both transversely and longitudinally as indicated by levels 48 and 49. When base plate 11 is levelled as indicated by levels 48 and 49, the four locknuts 28 are tightened to lock base adjusting screws 23 in their adjusted positions.

Next, superstructure 51 is adjusted in height through selection of intermediate posts 31 having the needed length. Locknuts 74 on adjusting screws 68, 69 are loosened. Adjusting screws 68, 69 are then turned for fine adjustment until the assembly of side supports 54, 55 and associated structure is at the selected height for the element under test and is levelled as indicated by levels 81, 82. Locknuts 74 are then tightened to lock screws 68, 69 in their adjusted positions.

The specimen 42 to be tested is mounted upon the specimen support 34 in the following manner: Assuming that a vacuum tube is to be tested and that such vacuum tube is to be mounted in a socket adaptor 40 having a radial flange (not shown) at the bottom thereof. The socket adaptor 40 is seated upon the top of threaded boss 37 of azimuth plate 36 and clamped tightly thereagainst by the internal flange (not shown) of cap 39. By this arrangement the test specimen 42 can be adjusted quickly and with ease either transversely of base plate 11 or rotationally in azimuth. Adjustment transversely of base plate 11 is accomplished by loosening clamp screws 45 with resultant loosening of clamping dogs 46. Azimuth plate 36 is then moved in recess 35 of base plate 11 to desired position and clamping screws 45 are tightened to clamp dogs 46 against azimuth plate 36 to lock azimuth plate 36 in position. Rotation of the specimen 42 which is mounted in the adaptor 40 is accomplished by unscrewing cap 39 from threaded boss 37 of azimuth plate 36 and rotating in azimuth the adaptor 40 that supports the specimen 42. An indication of the position in azimuth of the specimen 42 is provided by azimuth markings 38 in cooperation with a pointer or the like (not shown) on adaptor 40. When the specimen 42 is rotated into desired position it is locked in such position by tightening cap screw 39 on threaded boss 37 of azimuth plate 36. The position into which the adaptor 40 is finally adjusted is determined by the path of pendulum ball 124A; it is necessary that the specimen 42 be properly disposed within such path, preferably in such position that ball 124A will impart sharply and directly against the tube specimen envelope.

Pendulum support 85 is adjusted along bars 61, 62 by loosening locknuts 108, 109 to permit sliding of pendulum support 85 into desired position. This permits locating of pendulum ball 124A when at rest in desired position relative to test specimen 42. During this adjusting operation pins 106 and 107 extending outwardly from boss 61, 62 remain fixed relative to bars 61, 62 while the radial arm 93 of arcuate indicator segment 92 and the flange 87 whose respective slots 94 and 84 are in registration with pins 106 and 107 slide relative to bars 61 and 62. When pendulum support 85 is adjusted into desired position locknuts 108, 109 are tightened. The position into which pendulum support 85 is adjusted is determined by the position of the point of impact of the specimen 42 to be tested. It is frequently desirable that with pendulum ball 124A hanging freely under the action of gravity, ball 124A be lightly in contact with the test specimen 42 at the particular point at which it is desired to impart shock to the specimen 42. It is necessary that adjustment of the position of adaptor 40 in the manner described hereinbefore be accomplished in coordination with adjustment of pendulum support 85 in order that location of the specimen 42 on one hand and location of the pendulum path on the other hand will be such as to provide for imparting of shock at the desired point on the specimen 42 and at the desired portion of the stroke of the pendulum 124.

Radial arm 103 is next adjusted along sector 96 of indicator segment 92. This is accomplished by loosening lock screw 105 and moving radial arm 103 which carries stop plate 104 into desired position. The desired position is indicated by registration of index mark 98 with the predetermined angular marking 97. With radial arm 103 in desired position lock screw 105 is tightened. The position to which radial arm 103 is adjusted is determined by the preselected angular stroke of pendulum ball 124A between stop plate 104 of radial arm 103 and the point of impact on specimen 42.

Screw 151 is next turned backward, after loosening screw 157, to withdraw adjusting bracket 143. Cam 171 is thereby carried toward adjusting post 89 until there is clearance between cam 171 and housing 121 (Fig. 6). Switch 183 (Fig. 5) is next thrown into position to energize motor 182 under which conditions pilot light 185 illuminates. Rotation of motor 182 causes rotation of pinion 182A and entrained gear 169 together with shaft 167. This operation causes rotation of cam 171 which turns freely and out of contact with housing 121. Screw 151 is then gradually turned to advance the adjusting bracket 143 and cam 171 thereby carried. In this manner friction segments 172, 173 of cam 171 are brought gradually into light engagement with friction surfaces 122, 123 of housing 121. Screw 151 is turned until friction contact between cam 171 and housing 121 is such that rotation of cam 171 causes housing 121 to turn sufficiently to swing pendulum ball 124A into contact with stop plate 104 of radial arm 103. In the event that radial arm 103 is located along sector 96 of indicator segment 92 at an angular position less than the substantially 90 degrees referred to above, pendulum ball 124A will be brought to rest against stop plate 104 while cam 171 is still turning with its friction segment 172 or 173 in contact with friction surfaces 122, 123 of housing 121. Under these conditions there is slippage between segments 172 or 173 of cam 171 and surfaces 122, 123 of housing 121; this action occurs for the cam modification shown because friction segments 172, 173 cover approximately 90 degrees arcs. It is necessary that screw 151 be so adjusted that such slippage can occur while retaining pendulum ball 124A against stop plate 104. When shaft 167 rotates into position such that cutout 174 or 175 is in registration with friction surfaces 122, 123 of housing 121, housing 121 is released so that housing 121 together with pendulum ball 124A is free to fall by the action of gravity into contact with specimen 42 to impart shock thereto.

Though the pendulum tapper as described above includes a double lobe cam wherein each lobe covers an arcuate expanse of 90 degrees, variations of the cam shown may be included in the tapper for particular operational characteristics; for example a single lobe cam may be used. The single lobe may cover an arcuate expanse just sufficient to cause the pendulum to sweep through a preselected angular expanse to stop plate 104 before release. The angular expanse may be greater. Likewise more than two lobes may be employed and/or the radius of the lobes may be increased or decreased. Suitable programming may be obtained if the cam has a plurality of interruptions having difficult dimensions. It is generally desirable in designing the cam that it picks up the pendulum arm with minimum vibration and shock after a blow is imparted to the test specimen and before the pendulum arm can swing back and hit again. This is necessary in order to obtain results from controlled experiments that accurately reflect cause and effect.

The pendulum tapper is readily adapted for manual operation. The pendulum can be raised manually to the desired angular position from which it may be released by any suitable manually operable latch or detent (not shown). Manual operation of the pendulum permits observation of the effects of single impacts.

If the pendulum tapper is used for testing vacuum tubes, an ordinary commercial tube socket may be included in the adaptor 40. The pendulum tapper is adapted to impart sharp impacts directly to the tube envelope for the purpose of exciting microphonism over a wide band of frequencies ranging from low audio frequency well into the radio frequency range. By means of the adjustments shown whereby the severity of the blow may be adjusted the blow can be selectively destructive or nondestructive. Furthermore, by this arrangement there is no need of reseating between blows since the tube remains in the adaptor socket. Through proper selection of gears and cam lobe radius a wide range of tapping speeds can be accommodated.

The pendulum tapper described above is characterized by several major advantages over previous equipment of this nature. First of all, the severity of the shock imparted by the pendulum to the element under test is readily adjustable and more particularly for angular sweeps up to 30 degrees the relationship between the severity of the blow, and the extent of angular sweep of the pendulum, is linear. Secondly, the pendulum tapper is characterized by repeatability and reproducibility. A pendulum tapper embodying the disclosed design operates cyclically on a test specimen yielding an identical repeat performance for every cycle. A second pendulum tapper made according to the same design and having the same dimensions throughout performs identically with the first pendulum tapper, reproducing action of the first no matter what the geographical location of the second. These advantages stem from the utilization of the law of the pendulum.

In Figure 8 there is shown a preferred audiofrequency noise and microphonic evaluation circuit arrangement for use in conjunction with the pendulum tapper assembly above-described. The circuit includes the tube-under-test 201 which for purposes of illustration is shown in the form of a pentode. The control grid 202 of the pentode is connected to ground through a grid resistor 203. Cathode resistor 204 and bypass condenser 205 connect the cathode 207 to ground and bias the tube. The suppressor grid 208 of the tube 201 is connected to cathode 207. The screen grid 210 is connected to screen grid supply $B_2+$ through a screen grid resistor 212. A smoothing condenser 211 is connected in parallel with the combined resistor 212 and supply $B_2+$ for smoothing the voltage on the screen grid. The plate 214 is connected to the plate supply $B_1+$ through a load resistor 215. The tube 201 is hooked up as a conventional pentode amplifier. However, in place of a signal input to the grid 202, the tube elements are mechanically excited through shock, whereby variations in capacitance cause the plate current to vary providing an output signal. The signal derived at the plate 214 is conventionally coupled into a preamplifier and cathode follower stage 217 and from there is in turn coupled into voltage amplifier 219. From the voltage amplifier 219 the amplified signal is made available to a pair of indicating circuits simultaneously. The two circuits comprise an average indicating circuit generally indicated at 221 and a peak indicating circuit generally indicated at 222.

Considering first the peak indicating circuit: the signal from the voltage amplifier 219 is fed into a phase-splitting network 220 to separate the positive voltage variations from the negative voltage variations so that they may be independently applied to the peak indicating circuit 222. The positive and negative voltage variations, respectively are applied as positive pulses to the control grids 225 and 226 of the gas tubes 228 and 229 respectively. Each of the grids 225 and 226 of the gas tubes 228 and 229 are provided with fixed bias by batteries 231 and 232. Rheostats 233 and 234 permit accurate adjustment of grid bias. Switching means 235 and 236 are connected in circuit with the batteries 231 and 232 to terminate drain on the batteries when the circuit is not in use. Grid resistors 238 and 239 are connected in series with the pickoff arms of the rheostats 233 and 234. The condensers 241 and 242 couple the phase splitting network 220 to the gas tubes 228 and 229.

In circuit with the plates 244 and 245 of the gas tubes 228 and 229 are plate resistors 251 and 252 and neon glow lamps 254 and 255. Connected in parallel across the glow lamps 254 and 255 are resistors 256 and 257 respectively. In the plate circuit of gas tube 228 is a switch 258A and the plate circuit of gas tube 229 is a switch 258. Connected to the junction of the neon glow lamps 254 and 255 is a normally closed disconnect switch 261 shunted by a protective condenser 262 connected in series with the plate supply $B_3+$.

In operation the peak circuit 222 is initially adjusted for the particular tube type being tested. The bias voltages on the grids of the gas tubes 228, 229 are set at their maximum negative values. The contactor of switch 265 in circuit with the preamplifier 217 is moved into contact with the terminal of the calibration signal generator 266. The gain of the amplifier 219 is adjusted to yield a predetermined peak-to-peak voltage at the input to the peak indicating circuit 222 with a specified calibrating voltage introduced to the preamplifier 217. The bias voltage on each of the peak indicating gas tubes 228 and 229 are reduced in turn to the level at which each tube just fires as indicated by the associated neon glow lamps 254 and 255 respectively. This is accomplished for each gas tube 228 and 229 with the grid bias control 233 or 234 of the tube other than the one being adjusted set for maximum negative potential. After gas tubes 228 and 229 have adjusted the calibrating signal is removed by moving the contactor of switch 265 into series circuit with the plate of the tube-under-test 201. The plate circuit switches 258A and 258 are closed. The normally closed disconnect switch 261, hereinafter further referred to as a reset switch, is pushed and the tube-under-test 201 is then connected into the test circuit. Tapping of the tube then commences. Since the voltage applied to the grid of each of the gas tubes 228 and 229 is that corresponding to alternate half cycles of the signal voltage generated by the tube-under-test 201, the respective gas tubes 228 and 229 will break down and conduct if the respective grid input voltage peak exceeds a predetermined maximum. Assuming that the voltage peak applied to the grid 225 of the gas tube 228 is sufficient to raise the grid 225 to or above cutoff; the tube 228 will break down and current from the $B_3+$ supply will flow through the normally closed reset switch 261, closed switch 258A through the tube 228 to ground. When the current flowing through the tube 228 is of sufficient magnitude to cause the potential drop across the resistor 256 to exceed the firing potential of the glow lamp 254 the latter lights. When this occurs indication is afforded that the tube-under-test 201 is not acceptable.

The tube-under-test 201 is likewise not acceptable if the glow lamp 255 lights for substantially the same reason. The reset switch 261 is manually operated to open circuit position to terminate the current flow through the gas tube 223 preparatory to testing the next tube 201. If the testing procedure does not result in the lighting of either of the glow lamps 254 and 255 indication is afforded that the peak voltages generated by the tube under test resulting from the shock imparted thereto by the pendulum tapper does not exceed a predetermined maximum. Where both of the glow lamps 254 and 255 light up during a test indication is afforded that both the positive and negative voltage peaks generated in the tube-under-test 201 are excessive.

The average indicating circuit 221 is connected to the output transformer 271 of power amplifier 272. The secondary of the output transformer 271 is provided with a constant load represented by the resistors 274 and 275. The purpose of the load is to permit exploitation of the full frequency response capabilities of the output transformer 271. Uniform frequency response is obtained when the transformer 271 is terminated in a constant matching resistance.

A pair of accurately matched rectifiers 276 and a pair of accurately matched rectifiers 277 are connected in series with opposite ends of the secondary of the transformer 271. Two rectifiers connected in series as shown are used to increase the ratio of back-to-forward resistance. The pairs of rectifiers are arranged so as to function as a full-wave rectifier at the output of the transformer 271. A resistor 279 and a condenser 281 are arranged as an integrator circuit for the grid 283 of the gas tube 284. The R-C combination is designed to have a long time constant. Due to the fact that the R-C circuit is not a true integrator, the condenser 281 charges to a voltage determined by the difference of potential between the voltage on the condenser and the charging potential at any instant. A shorting switch 285 is provided in parallel across the condenser 281 for the purpose of discharging the condenser prior to the start of a test. A battery 286 and a rheostat 287 provides adjustable bias for the grid 283 of the tube 284. In the plate circuit of the gas tube 284 is a resistor 289, a neon glow tube 291 across which there is connected a resistor 292, a normally closed reset switch 293, shunted by a protective condenser 294, and the supply $B_3+$.

In operation the averaging circuit 221 is initially adjusted by setting the bias voltage on the gas tube 284 at its maximum negative value. With the contactor switch 265 connected to the output terminal of the calibration signal generator 266, a calibrating signal is introduced to the preamplifier stage 217. The bias voltage on the gas tube 284 is then reduced until the gas tube just fires, as indicated by the associated neon glow lamp 291. The contactor of switch 265 is then moved to its other position in which it connects the plate of the tube-under-test to the preamplifier 217. After the reset switch 293 is opened to terminate current flow through the gas tube 284, and the switch 285 is momentarily closed to discharge condenser 281, the average indicating circuit is ready for testing a tube 201. When shock is imparted to the tube-under-test 201 by means of the associated pendulum tapper, the voltage output from the transformer 271 is rectified by the accurately matched pairs of rectifiers 276 and 277 and then applied to the RC integrator circuit comprising the resistor 279 and the condenser 281. If, during the test period, the voltage across the condenser 281 is increased to a level sufficient to raise the grid 283 of the gas tube 284 to or above cutoff, the tube 284 breaks down permitting current to flow from the plate supply $B_3+$ through normally closed switch 293, resistor 292, and resistor 289. When enough current flows through the gas tube 284 to cause the voltage drop across the resistor 292 to exceed the ignition voltage of the neon glow lamp 291, the glow lamp lights, whereby an indication is afforded that the tube-under-test 201 is not acceptable. The average indicating circuit 221 serves to indicate whether or not the average noise and microphonic output from the tube-under-test due to the shock imparted by the pendulum tapper exceeds an acceptable maximum level. If the glow lamp 291 does not light during a test, indication is afforded that the average noise and microphonic voltage output from the tube 201 does not exceed an acceptable maximum level.

It is to be noted that both the average indicating circuit 221 and the peak indicating circuit 222 operate independently but simultaneously. If any one of the glow lamps 254, 255, or 291, or any combination of these are lighted during a test, indication is afforded that the tube 201 is not acceptable.

In Figure 9 there is shown a modified circuit arrangement in block form which may be used in place of the circuit shown in Figure 8. In this circuit the phase splitting network 220 of Figure 8 is eliminated. The voltage output from full wave rectifier 295 is supplied to a peak indicator circuit 222, and simultaneously to an average indicator 221 through an integrator circuit 297.

The circuit is characterized by comparative simplicity. It affords an instantaneous, simultaneous indication as to whether or not maximum acceptable levels of peak and average noise and microphonic output is exceeded, whereby there is derived a complete picture of electrical output of an electrical component when mechanically excited. The indication derived from the circuit described is in terms of "go" or "no-go" and is completely objective. As described in connection with the pendulum tapper the circuit is also characterized by repeatability and reproducibility of indication. With suitable modifications of the circuit described that are within the purview of those skilled in the art, quantitative values of tube resonances may be obtained in place of "go" or "no-go."

Obviously many modifications and variations of the present invention are possible in the light of the above teachings. It is therefore to be understood that within the scope of the appended claims the invention may be practiced otherwise than as specifically described.

We claim:

1. A tapper comprising a base, a base mount, vibration isolator means coupling said base mount to said base, a support for a specimen on said base, said base and support together being considerably larger and heavier than said support alone; a superstructure on said base mount, a pendulum support adjustably mounted on said superstructure and including a driven member, a pendulum on said pendulum support adapted to be actuated by said driven member for swinging movement toward and away from said specimen support, a frame adjustably mounted on said superstructure, a driving member on said frame, and means interconnecting said driven and driving members.

2. A tapper comprising a base, a base mount, vibration isolator means coupling said base mount to said base, an adjustable support for a specimen on said base, said base and support together being considerably larger and heavier than said support alone; a superstructure rigid with said base mount and adapted for height adjustment relative thereto, a pendulum support adjustably mounted on said superstructure and including a driven member, a pendulum on said pendulum support adapted to be actuated by said driven member for swinging movement toward and away from the specimen support, a frame adjustably mounted on said superstructure, a driving member on said frame, and means interconnecting said driven and driving members.

3. A tapper comprising a base, a base mount, vibration isolator means coupling said base mount to said base, a support for a specimen on said base, said base and support together being considerably larger and heavier than said support alone; a superstructure on said base mount, and a pendulum on said superstructure for swinging movement toward and away from the specimen support.

4. A tapper comprising a base, a base mount, vibration isolator means coupling said base mount and said base, a support for a specimen on said base, said base and support together being considerably larger and heavier than said support alone; a superstructure on said base, a pendulum support adjustably mounted on said superstructure and including a driven member, a pendulum on said pendulum support adapted to be actuated by said driven member for swinging movement toward and away from the specimen support, said pendulum support being adjustable to move the pendulum pivot in a plane substantially normal to the pendulum radius when at rest, and means for driving said driven member cyclically.

5. A tapper comprising a base, a base mount, vibration isolator means coupling said base mount and said base, a support for a specimen on said base, said base and support together being considerably larger and heavier than said support alone; a superstructure on said base, a driven member provided with a friction surface rotatably mounted on said superstructure and including a pendulum, a frame slidably mounted on said superstructure, a driving member provided with a friction surface, one of said friction surfaces being interrupted, said driving member being rotatable on said frame and frictionally engaging said driven member cyclically, said driving member adapted upon sliding of said frame for movement with said frame toward and away from said driven member, and means coupling said superstructure and said frame for causing sliding movement of said frame.

6. A tapper as described in claim 5 wherein said driven member is provided with a friction surface, said driving member is provided with a friction surface divided by periodic interruptions and adapted to engage with the friction surface of said driven member whereby said driven member has complete freedom of motion when the interruptions on said driving member comes into registration with the friction surface of said driven member to permit the pendulum to move toward vertical orientation.

7. A drive means comprising a rotary driving member having a friction surface divided by periodic interruptions, a rotary driven member having a continuous friction surface adapted for engagement with the friction surface of said driving member whereby said driven member is caused to move under the action of the driven member when the friction surfaces of said driving and driven members engage and said driven member is permitted to move free of interference by said driving member when the interruptions in the friction surface of said driving member come into registration with the friction surface of said driven member.

8. A drive means as described in claim 7 and including additional means for biasing said driven member to one position.

9. An indicator circuit in combination with a specimen tube undergoing shock test for ascertaining whether the noise and microphonic output signal generated by the specimen tube during the shock test exceeds predetermined quantitative limits, said specimen tube having a control grid, a grid resistor for connecting said control grid to means providing a constant reference potential, the remainder of the elements of said specimen tube connected as an amplifier, a voltage amplifier connected to said specimen tube for amplifying the output signal generated by the specimen tube and due to relative movement of the elements of said specimen tube caused by shock imparted to the specimen tube during the shock test, an average indicator circuit and a peak indicator circuit connected in parallel to the voltage amplifier; said average indicator circuit including a power amplifier connected to said voltage amplifier, a full wave rectifier for rectifying the output of said power amplifier, a gas tube having a control grid, an RC circuit having a long time constant connected between said full wave rectifier and the grid of said gas tube for raising the voltage on the grid of the gas tube as a function of the difference in potential between the voltage on the condenser and the charging potential of the full wave rectifier at any instant, means connected to the grid of said gas tube for biasing said gas tube a predetermined amount beyond cutoff whereby the output voltage of the RC circuit when exceeding a predetermined level is adapted to raise the bias on the gas tube above cutoff, indicating means in the plate circuit of said gas tube adapted to afford a visual indication when the bias on the gas tube is raised above cutoff; said peak indicator circuit including second and third gas tubes each having a control grid, separate means connected to the respective grids of the second and third gas tubes for biasing the second and third gas tubes a predetermined amount beyond cutoff, a phase splitting network connected to the output terminals of the voltage amplifier and adapted to supply the separated voltage variations to the respective grids of the second and third gas tubes, indicating means in the plate circuits of said second and third gas tubes adapted to afford an indication of whether either of the gas tubes is raised above cutoff due to the application of a voltage peak of magnitude exceeding a predetermined level.

10. An indicator circuit in combination with a specimen tube undergoing shock test for ascertaining whether the noise and microphonic output signal generated by the specimen tube during the shock test exceeds predetermined quantitative limits, said indicator circuit including an amplifier adapted to amplify the output signal generated by said specimen tube, an average indicator circuit and a peak indicator circuit simultaneously operable and adapted to afford indications as to whether the average level of the signal voltage exceeds predetermined limits respectively; said average indicator circuit including a full wave rectifier, a gas tube having a control grid, RC circuit means connected between said full wave rectifier and the control grid of said gas tube for applying a voltage to the grid of the gas tube that is a function of the difference in potential between the voltage on the condenser and the charging potential of the full wave rectifier, second means connected to the grid of said gas tube for biasing said gas tube a predetermined amount beyond cutoff whereby the output from the RC circuit means when exceeding a predetermined limit is adapted to raise the bias on the gas tube above cutoff, third means adapted to afford a visual indication when the bias on said gas tube is raised above cutoff; said peak indicator circuit including, second and third gas tubes each having a control grid, fourth means connected to the respective control grids of the second and third gas tubes for biasing the second and third gas tubes a predetermined amount beyond cutoff, fifth means for separating the positive going and the negative going voltage variations originating at the specimen tube for applying the separated voltage variations as positive going voltages in each case to the respective grids to the second and the third gas tubes, sixth means for indicating when either of the second and third gas tubes is raised above cutoff.

11. A shock testing device comprising a tapper and an indicator circuit, said tapper including a base, a base mount, vibration isolator means coupling said base mount to said base, a support for a specimen vacuum tube on said base, a superstructure on said base mount, a pendulum support adjustably mounted on said superstructure and including a driven member, a pendulum on said pendulum support adapted to be actuated by said driven member for swinging movement toward and away from said specimen support, a frame adjustably mounted on said superstructure, a driving member on said frame, and means interconnecting said driven and driving members; said indicator circuit adapted to be connected to a specimen vacuum tube having a control grid and mounted on said tapper and undergoing shock test for ascertaining whether the noise and microphonic output signal generated by the specimen vacuum tube during the shock test exceeds predetermined quantitative limits, said indicator circuit including a grid resistor for connecting the control grid of the specimen vacuum tube to means providing a constant reference potential, means for connecting the remainder of the elements of the specimen vacuum tube as an amplifier, a voltage amplifier adapted for connection to the specimen tube for amplifying the output signal generated by the specimen tube due to relative movement of the elements of the specimen vacuum tube caused by shock imparted to the specimen vacuum tube during the shock test; an average indicator circuit and a peak indicator circuit connected in parallel and to said voltage amplifier; said average indicator circuit including a power amplifier connected to said voltage amplifier, a full wave rectifier for rectifying the output of said power amplifier, a gas tube having a control grid, an RC circut having a long time constant connected between said full wave rectifier and the grid of said gas tube for applying a voltage to the grid of the gas tube as a function of the difference in potential between the voltage on the condenser and the charging potential of the full wave rectifier at any instant, means connected to the grid of said gas tube for biasing said gas tube a predetermined amount beyond cutoff whereby the output voltage of the RC circuit when exceeding a predetermined level is adapted to raise the bias on the gas tube above cutoff, indicating means in the plate circuit of said gas tube adapted to afford a visual indicator when the bias on the gas tube is raised above cutoff; said peak indicator circuit including second and third gas tubes each having a control grid, separate means connected to the respective control grids of the second and third gas tubes for biasing the second and third gas tubes a predetermined amount beyond cutoff, a phase splitting network connected to the output terminals of the voltage amplifier and adapted to apply the separated voltage variations to the respective grids of the second and third gas tubes, indicating means in the plate circuits of said second and third gas tubes adapted to afford an indication of whether either of the gas tubes is raised above cutoff due to the application of a voltage peak of magnitude exceeding a predetermined level.

12. A shock testing device comprising a tapper and an indicator circuit, said tapper including a base, a base mount, vibration isolator means coupling said base mount to said base, an adjustable support for a specimen vacuum tube on said base, a superstructure rigid with said base mount and adapted for height adjustment relative thereto, a pendulum support adjustably mounted on said superstructure and including a driven member, a pendulum on said pendulum support adapted to be actuated by said driven member for swinging movement toward and away from the specimen support, a frame adjustably mounted on said superstructure, a driving member on said frame, and means interconnecting said driven and driving members; said indicator circuit adapted to be connected to a specimen vacuum tube having a control grid and mounted on said tapper and undergoing shock test for ascertaining whether the noise and microphonic output signal generated by the specimen vacuum tube during the shock test exceeds predetermined quantitative limits, said indicator circuit including, a grid resistor for connecting the control grid to means providing a constant reference potential, means for connecting the remainder of the elements of the specimen vacuum tube as an amplifier, a voltage amplifier adapted for connection to the specimen tube for amplifying the output signal generated by the specimen tube due to relative movement of the elements of the specimen tube caused by shock imparted to the specimen vacuum tube during the shock test, an average indicator circuit and a peak indicator connected in parallel and to said voltage amplifier; said average indicator circuit including a power amplifier connected to said voltage amplifier, a full wave rectifier for rectifying the output of said power amplifier a gas tube having a control grid, an RC circuit having a long time constant connected between said full wave rectifier and the grid of said gas tube for applying a voltage to the grid of the gas tube as function of the difference in potential between the voltage on the condenser and the charging potential of the full wave rectifier at any instant, means connected to the grid of said gas tube for biasing said gas tube a predetermined amount beyond cutoff whereby the output voltage of the RC circuit when exceeding a predetermined level is adapted to raise the bias on the gas tube above cutoff, indicating means in the plate circuit of said gas tube adapted to afford a visual indication when the bias on the gas tube is raised above cutoff; said peak indicator circuit including second and third gas tubes each having a control grid, separate means connected to the respective control grids of the second and third gas tubes for biasing the second and third gas tubes a predetermined amount beyond cutoff, a phase splitting network connected to the output terminals of the voltage amplifier and adapted to apply the separated voltage variations to the respective grids of the second and third gas tubes, indicating means in the plate circuits of said second and third gas tubes adapted to afford an indication of whether either of the gas tubes is raised above cutoff due to the application of a voltage peak magnitude exceeding a predetermined level.

13. A shock testing device comprising a tapper and an indicator circuit, said tapper including a base, a base mount, vibration isolator means coupling said base mount to said base, a support for a specimen vacuum tube on said base, a superstructure on said base mount, a pendulum support adjustably mounted on said superstructure and including a driven member, a pendulum on said pendulum support adapted to be actuated by said driven member for swinging movement toward and away from said specimen support, a frame adjustably mounted on said superstructure, a driving member on said frame, and means interconnecting said driven and driving members, said indicator circuit adapted to be connected to a specimen vacuum tube mounted on said tapper and undergoing shock test for ascertaining whether the noise and microphonic output signal generated by the specimen vacuum tube during the shock test exceeds predetermined quantitative limits, said indicator circuit including amplifier means adapted to amplify the output signal generated by said specimen tube, an average indicator circuit and a peak indicator circuit simultaneously operable and adapted to afford indications as to whether the average level of the signal voltage exceeds a predetermined limit and whether the voltage peaks of said signal exceeds predetermined limits respectively; said average indicator circuit including, a full wave rectifier, a gas tube having a control grid, RC circuit means connected between said full wave rectifier and the control grid of said gas tube for applying a voltage to the grid of the gas tube that is a function of the difference in potential between the voltage on the condenser and the charging potential of the full wave rectifier, at any instant, second means connected to the grid of said gas tube for biasing said gas tube a predetermined amount beyond cutoff whereby the output from the RC circuit means when exceeding a predetermined limit is adapted to raise the bias on the gas tube above cutoff, third means adapted to afford a visual indication when the bias on said gas tube is raised above cutoff; said peak indicator circuit including, second and third gas tubes each having a control grid, fourth means connected to the respective control grids of the second and third gas tubes for biasing the second and third gas tubes a predetermined amount beyond cutoff, fifth means for separating the positive going and the negative going voltage variations originating at the specimen tube for applying the separated voltage variations as positive going voltages in each case to the respective grids to the second and the third gas tubes, sixth means for indicating when either of the second and third gas tubes is raised above cutoff.

14. A shock testing device comprising a tapper and an indicator circuit, said tapper including a base, a base mount, vibration isolator means coupling said base mount to said base, an adjustable support for a specimen vacuum tube on said base, a superstructure rigid with said base mount and adapted for height adjustment relative thereto, a pendulum support adjustably mounted on said superstructure and including a driven member, a pendulum on said pendulum support adapted to be actuated by said driven member for swinging movement toward and away from the specimen support, a frame adjustably mounted on said superstructure, a driving member on said frame, and means interconnecting said driven and driving members; said indicator circuit adapted for connection to a specimen vacuum tube mounted on said tapper and undergoing shock test for ascertaining whether the noise and microphonic output signal generated by the specimen vacuum tube during the shock test exceeds predetermined quantitative limits, said indicator circuit including amplifier means adapted to amplify the output signal generated by said specimen tube, an average indicator circuit and a peak indicator circuit simultaneously operable and adapted to afford indications as to whether the average level of the signal voltage exceeds a predetermined limit and whether the voltage peaks of said signal exceed predetermined limits respectively; said average indicator circuit including, a full wave rectifier, a gas tube having a control grid, RC circuit means connected between said full wave rectifier and the control grid of said gas tube for applying a voltage to the grid of the gas tube that is a function of the difference in potential between the voltage on the condenser and the charging potential of the full wave rectifier at any instant, second means connected to the grid of said gas tube for biasing said gas tube a predetermined amount beyond cutoff whereby the output from the RC circuit means when exceeding a predetermined limit is adapted to raise the bias on the gas tube above cutoff, third means adapted to afford a visual indication when the bias on said gas tube is raised above cutoff; said peak indicator circuit including, second and third gas tubes each having a control grid, fourth means connected to the respective control grids of the second and third gas tubes for biasing the second and third gas tubes a predetermined amount beyond cutoff, fifth means for separating the positive going and the negative going voltage variations originating at the specimen tube for applying the separated voltage variations as positive going voltages in each case to the respective grids to the second and the third gas tube, sixth means for indicating when either of the second and third gas tubes is raised above cutoff.

15. An indicator circuit for use in combination with a specimen vacuum tube undergoing shock test for ascertaining whether the noise and microphonic output signal generated by the specimen vacuum tube during the shock test exceeds predetermined quantitative limits and where such specimen vacuum tube has a control grid, and the elements of the specimen vacuum tube are connected as an amplifier, said indicator circuit comprising; a voltage amplifier for connection in circuit with said specimen vacuum tube for amplifying the output signal generated by the specimen vacuum tube due to relative movement of the elements of said specimen vacuum tube caused by shock imparted to the specimen vacuum tube during a shock test, an average indicator circuit and a peak indicator circuit, means for coupling said average indicator circuit and said peak indicator circuit to said voltage amplifier; said average indicator circuit including a fullwave rectifier at its input end, a gas tube having a control grid, and RC circuit characterized by a long time constant connected between said fullwave rectifier and the control grid of said gas tube for raising the voltage on the grid of said gas tube as a function of the difference of potential between the voltage on the condenser of said RC circuit and the charging potential of said fullwave rectifier at any instant, means for biasing said gas tube a predetermined amount beyond cutoff whereby the voltage developed across the condenser of said RC circuit when exceeding a predetermined level raises the potential of the grid of said gas tube above cutoff, indicating means in circuit with the plate of said gas tube adapted to afford a visual indication when the potential of the grid of said gas tube is raised above cutoff; said peak indicator circuit including normally nonconducting means, indicating means connected in circuit with said nonconducting means, and means for connecting said normally nonconducting means to said voltage amplifier whereby voltage peaks from said voltage amplifier are applied to said normally nonconducting means, whereby said indicating means connected in circuit with said normally nonconducting means is energized to afford a visual indication when the magnitude of any of the voltage peaks applied to said normally nonconducting means exceeds a predetermined quantitative level.

References Cited in the file of this patent

UNITED STATES PATENTS

| | | |
|---|---|---|
| 210,002 | Brotherhood | Nov. 19, 1878 |
| 386,605 | Preater | July 24, 1888 |
| 403,676 | Keep | May 21, 1889 |
| 463,259 | Estrada | Nov. 17, 1891 |
| 1,173,395 | Taylor | Feb. 29, 1916 |
| 1,462,813 | McAdam | July 24, 1923 |
| 2,359,044 | MacBride | Sept. 26, 1944 |
| 2,362,589 | Simmons | Nov. 14, 1944 |
| 2,418,437 | Vogt | Apr. 1, 1947 |
| 2,487,599 | Schell | Nov. 8, 1949 |
| 2,500,431 | Potter | Mar. 14, 1950 |
| 2,553,391 | Tyler | May 15, 1951 |